United States Patent
Ha

(10) Patent No.: US 12,056,814 B2
(45) Date of Patent: Aug. 6, 2024

(54) IMAGE PROCESSING METHOD AND APPARATUS WITH INTEGRATED OPTIMIZATION FRAMEWORK OF HETEROGENEOUS FEATURES

(71) Applicant: SAMSUNG ELECTRONICS CO., LTD., Suwon-si (KR)

(72) Inventor: Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 17/838,414

(22) Filed: Jun. 13, 2022

(65) Prior Publication Data

US 2023/0169722 A1 Jun. 1, 2023

(30) Foreign Application Priority Data

Nov. 29, 2021 (KR) .................. 10-2021-0167084

(51) Int. Cl.
*G06T 17/00* (2006.01)
*G06T 5/00* (2024.01)
(Continued)

(52) U.S. Cl.
CPC .............. *G06T 17/00* (2013.01); *G06T 7/75* (2017.01); *G06T 15/08* (2013.01); *G06T 15/506* (2013.01);
(Continued)

(58) Field of Classification Search
CPC ........... G06T 17/00; G06T 7/75; G06T 15/08; G06T 15/506; G06T 11/001;
(Continued)

(56) References Cited

U.S. PATENT DOCUMENTS 10,360,718 B2 * 7/2019 Chernov ................ G06T 17/20
10,586,344 B2 3/2020 Qi
(Continued)

FOREIGN PATENT DOCUMENTS

EP 3 680 809 A1 7/2020

OTHER PUBLICATIONS

Platinsky, Lukas, et al. "Monocular Visual Odometry: Sparse Joint Optimisation or Dense Alternation?." *2017 IEEE International Conference on Robotics and Automation (ICRA). IEEE,* Jul. 24, 2017; (8 pages in English).

(Continued)

*Primary Examiner* — Wesner Sajous
(74) *Attorney, Agent, or Firm* — NSIP Law

(57) ABSTRACT

An image processing method and apparatus with an integrated framework of heterogeneous features is provided. The method includes generating first feature frames including first features corresponding to a first density level by sensing a target space; generating second feature frames including second features corresponding to a second density level by sensing the target space; estimating sensor poses corresponding to at least a portion of the generated first feature frames and the generated second feature frames; calculating each of a first reprojection error of the first features and a second reprojection error of the second features based on the estimated sensor poses; and acquiring an optimization result by adjusting at least a portion of the sensor poses, the first features, the second features, reprojection features of the first features, and reprojection features of the second features to decrease an integration error including the first reprojection error and the second reprojection error.

20 Claims, 11 Drawing Sheets

(51) Int. Cl.
*G06T 7/73* (2017.01)
*G06T 15/08* (2011.01)
*G06T 15/50* (2011.01)
*G06V 20/10* (2022.01)
*G06V 30/10* (2022.01)
*H04N 13/122* (2018.01)
*H04N 25/00* (2023.01)

(52) U.S. Cl.
CPC ............... *G06T 2200/08* (2013.01); *G06T 2207/20068* (2013.01); *G06T 2207/30244* (2013.01)

(58) Field of Classification Search
CPC ....... G06T 2200/08; G06T 2207/20068; G06T 2207/30244; G06T 5/00–5/06; G06T 5/08; G06T 5/007; G06T 5/40; G06V 20/10; G06V 30/10; H04N 13/122; H04N 13/128; H04N 13/139; H04N 13/144; H04N 13/243
See application file for complete search history.

(56) References Cited

U.S. PATENT DOCUMENTS

| | | |
|---|---|---|
| 2012/0121161 A1 | 5/2012 | Eade et al. |
| 2017/0097643 A1* | 4/2017 | Munich ................. B25J 19/005 |
| 2018/0283882 A1* | 10/2018 | He ......................... H04L 67/30 |
| 2019/0086933 A1* | 3/2019 | Munich ............... G05D 1/0274 |
| 2020/0193623 A1* | 6/2020 | Liu ......................... G06N 3/04 |
| 2022/0187841 A1* | 6/2022 | Ebrahimi Afrouzi ...................... G05D 1/0242 |
| 2022/0358262 A1* | 11/2022 | Jeon ......................... G06T 7/73 |
| 2022/0398775 A1* | 12/2022 | Streem ..................... G06T 7/75 |

OTHER PUBLICATIONS

Alismail, Hatem. "Direct Pose Estimation and Refinement" *Diss. Carnegie Mellon University*, Aug. 2016. (235 pages in English).

* cited by examiner

IMAGE PROCESSING METHOD AND APPARATUS WITH INTEGRATED OPTIMIZATION FRAMEWORK OF HETEROGENEOUS FEATURES

CROSS-REFERENCE TO RELATED APPLICATIONS

This application claims the benefit under 35 USC § 119(a) of Korean Patent Application No. 10-2021-0167084, filed on Nov. 29, 2021, in the Korean Intellectual Property Office, the entire disclosure of which is incorporated herein by reference for all purposes.

BACKGROUND

1. Field

The following description relates to an image processing method and apparatus with an integrated optimization framework of heterogenous features.

2. Description of Related Art

Simultaneous localization and mapping (SLAM) refers to technology that simultaneously performs localization and mapping. The SLAM may find an optimal solution for localization and mapping by using various available inputs, such as images and inertial measurement units (IMUs), as constraints. Space modeling refers to technology for configuring a three-dimensional (3D) spatial model corresponding to a 3D space. For example, a volume-based singed distance function (SDF) may be used for space modeling. The SLAM may use sparce features and the space modeling may use dense features.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes generating first feature frames that comprise first features corresponding to a first density level by sensing a target space; generating second feature frames that comprise second features corresponding to a second density level by sensing the target space; estimating sensor poses corresponding to at least a portion of the generated first feature frames and the generated second feature frames; calculating each of a first reprojection error of the first features and a second reprojection error of the second features based on the estimated sensor poses; and acquiring an optimization result by adjusting at least a portion of the sensor poses, the first features, the second features, unprojection features of the first features, and unprojection features of the second features to decrease an integration error that comprises the first reprojection error and the second reprojection error, wherein the second density level is higher than the first density level.

The calculating of each of the first reprojection error and second reprojection error may include determining first common space features by unprojecting the first features onto a three-dimensional (3D) space corresponding to the target space based on the estimated sensor poses; determining first reprojection features by reprojecting the first common space features onto two-dimensional (2D) planes corresponding to the generated first feature frames based on the estimated sensor poses; and calculating the first reprojection error based on an error between the first features and the first reprojection features.

The calculating of each of the first reprojection error and the second reprojection error may include determining second common space features by unprojecting the second features onto a 3D space corresponding to the target space based on the estimated sensor poses; determining second reprojection features by reprojecting the second common space features onto 2D planes corresponding to the second feature frames based on the estimated sensor poses; and calculating the second reprojection error based on an error between the second features and the second reprojection features.

The first feature frames may be generated at a first frame rate, wherein the second feature frames are generated at a second frame rate, and wherein the first frame rate is greater than the second frame rate.

The first features may correspond to hand-crafted features, and the second features correspond to depths or deep features.

The integration error may correspond to a sum of the first reprojection error and the second reprojection error.

The first feature frames may be implemented for simultaneous localization and mapping (SLAM) of the first density level, and the second feature frames may be implemented for three-dimensional (3D) space modeling of the second density level.

The method may further include estimating illumination information at a target point in a spatial model based on the 3D space modeling; and rendering a virtual object of the target point based on the illumination information.

The spatial model may include an illumination information channel that represents information about at least a portion of a position, a form, a shape, a brightness, a color, and a high dynamic range (HDR) of each illumination of the spatial model, and the estimating of the illumination information may include estimating the illumination information based on the illumination information channel.

In a general aspect, an image processing apparatus includes one or more processors; and a memory comprising instructions executable by the one or more processors, wherein, when the instructions are executed by the one or more processors, the one or more processors are configured to: generate first feature frames that comprise first features corresponding to a first density level by sensing a target space, generate second feature frames that comprise second features corresponding to a second density level by sensing the target space, estimate sensor poses corresponding to at least a portion of the generated first feature frames and the generated second feature frames, calculate each of a first reprojection error of the first features and a second reprojection error of the second features based on the estimated sensor poses, and acquire an optimization result by adjusting at least a portion of the sensor poses, the first features, the second features, unprojection features of the first features, and unprojection features of the second features to decrease an integration error that comprises the first reprojection error and the second reprojection error, and wherein the second density level is higher than the first density level.

The one or more processors may be further configured to determine first common space features by unprojecting the first features onto a three-dimensional (3D) space corresponding to the target space based on the estimated sensor poses, determine first reprojection features by reprojecting the first common space features onto two-dimensional (2D) planes corresponding to the generated first feature frames based on the estimated sensor poses, and calculate the first reprojection error based on an error between the first features and the first reprojection features.

The one or more processors may be further configured to determine second common space features by unprojecting the second features onto a 3D space corresponding to the target space based on the estimated sensor poses, determine second reprojection features by reprojecting the second common space features onto 2D planes corresponding to the second feature frames based on the estimated sensor poses, and calculate the second reprojection error based on an error between the second features and the second reprojection features.

The first feature frames may be generated at a first frame rate, the second feature frames may be generated at a second frame rate, and the first frame rate may be greater than the second frame rate.

The first features may correspond to hand-crafted features, and the second features may correspond to depths or deep features.

The second feature frames may be implemented for three-dimensional (3D) space modeling of the second density level, and a spatial model according to the 3D space modeling may include an illumination information channel that represents information about at least a portion of a position, a form, a shape, a brightness, a color, and a high dynamic range (HDR) of each illumination of the spatial model, and the processor may be further configured to estimate illumination information at a target point in the spatial model based on the illumination information channel, and render a virtual object of the target point based on the illumination information.

In a general aspect, an electronic device includes at least one sensor configured to generate sensing data by sensing a target space; and one or more processors configured to generate first feature frames that comprise first features corresponding to a first density level based on the generated sensing data, generate second feature frames that comprise second features corresponding to a second density level based on the generated sensing data, estimate sensor poses corresponding to at least a portion of the generated first feature frames and the generated second feature frames, calculate each of a first reprojection error of the first features and a second reprojection error of the second features based on the estimated sensor poses, and acquire an optimization result by adjusting at least a portion of the sensor poses, the first features, the second features, unprojection features of the first features, and unprojection features of the second features to decrease an integration error that comprises the first reprojection error and the second reprojection error, the second density level is higher than the first density level.

The one or more processors may be further configured to determine first common space features by unprojecting the first features onto a three-dimensional (3D) space corresponding to the target space based on the estimated sensor poses, determine first reprojection features by reprojecting the first common space features onto two-dimensional (2D) planes corresponding to the generated first feature frames based on the estimated sensor poses, calculate the first reprojection error based on an error between the first features and the first reprojection features, determine second common space features by unprojecting the second features onto a 3D space corresponding to the target space based on the estimated sensor poses, determine second reprojection features by reprojecting the second common space features onto 2D planes corresponding to the second feature frames based on the estimated sensor poses, and calculate the second reprojection error based on an error between the second features and the second reprojection features.

The first feature frames may be generated at a first frame rate, the second feature frames are generated at a second frame rate, the first features may correspond to hand-crafted features, the second features may correspond to depths or deep features, and the first frame rate may be greater than the second frame rate.

The second feature frames may be implemented for three-dimensional (3D) space modeling of the second density level, a spatial model according to the 3D space modeling may include an illumination information channel that represents information about at least a portion of a position, a form, a shape, a brightness, a color, and a high dynamic range (HDR) of each illumination of the spatial model, and the one or more processors may be further configured to: estimate illumination information at a target point in the spatial model based on the illumination information channel, and render a virtual object of the target point based on the illumination information.

Other features and aspects will be apparent from the following detailed description, the drawings, and the claims.

Figure 1:
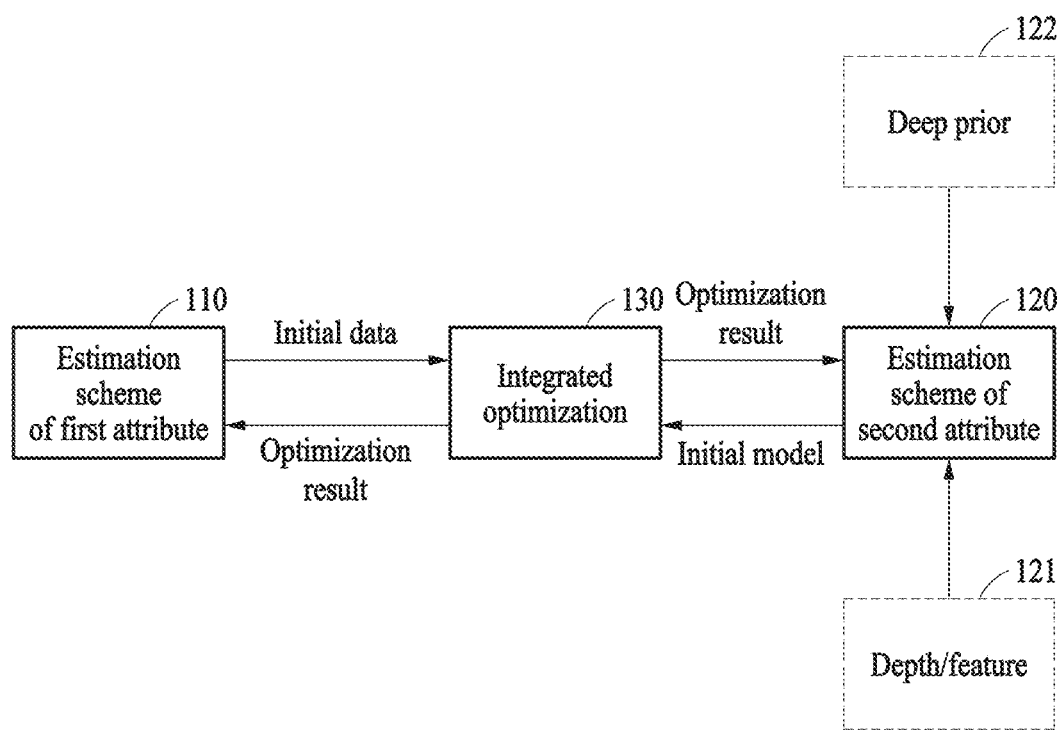
FIG. 1 illustrates an example of an integrated optimization framework of heterogeneous features, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, the examples are described in detail with reference to the accompanying drawings. Like reference numerals illustrated in the respective drawings refer to like elements and further description related thereto is omitted.

FIG. 1 illustrates an example of an integrated optimization frame of heterogeneous features. Referring to FIG. 1, an image processing apparatus may generate initial data or an initial model about space estimation through estimation schemes 110 and 120, and may optimize the initial data or the initial model through an integrated optimization 130. The estimation schemes 110 and 120 may estimate the same space using different attributes. In an example, the attributes may be classified into at least a portion of a feature density, a feature type, and a frame rate. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In an example, the estimation scheme 110 may estimate a space using a sparse feature at a high frame rate (e.g., 60 frames per second (fps)). In an example, a feature type may correspond to a hand-crafted feature. For example, the estimation scheme 110 of a first attribute may include simultaneous localization and mapping (SLAM). Hereinafter, although the SLAM may be described as an example of the estimation scheme 110, the estimation scheme 110 is not limited to the SLAM and descriptions related to the SLAM may apply to other examples of the estimation scheme 110.

The SLAM may simultaneously perform localization and mapping. The SLAM may find an optimal solution for localization and mapping by using various available inputs, such as images and inertial measurement units (IMUs), as constraints. The SLAM may extract features from an input image and may manage the extracted features as a point map through sampling. The extracted features may be represented as a graph in which the features are interconnected based on location tracking information. The SLAM may operate with a limited amount of computation through a limited number of sparse features.

The sparse features may be extracted from a characteristic area such as an edge in the entire image. Such features may correspond to spatially local features. In the SLAM, global information and sematic information may be excluded in addition to the spatially local features. Therefore, in the example of the occurrence of a texture-free area, a repetitive pattern area, or a high-speed movement, features may be mismatched. In this example, loss may occur in the accuracy of the SLAM and its recovery may also be difficult.

Additionally, the SLAM may have a characteristic depending on temporally local information that is acquired from adjacent frames. Therefore, the SLAM may represent low accuracy due to error accumulation over mid-to-long term. Back-end bundle adjustment (BA) may compensate for such temporally locality and error accumulation. When optimization is performed based on sparse features acquired through the front-end, BA may represent constraints caused by a failure in using spatially global information, and may also represent constraints in using temporally global information due to a limit in a number of frames that may be calculated according to a limit in an amount of computation.

To compensate for this, a loop closure, a relocalization, an essential graph optimization, and similar processes, may be implemented. In the example of combining the same with the typical method, an amount of storage may increase in proportion to a number of frames. Additionally, an issue, such as a low recall rate, may occur due to the use of sparse features. Therefore, efficiency and accuracy may decrease.

The estimation scheme 120 may estimate a space using dense features at a low frame rate (e.g., 2 fps). In an example, a feature type may correspond to a depth or a deep feature. In an example, the estimation scheme 120 of a second attribute may correspond to 3D space modeling using sparse features. Hereinafter, although space modeling may be described as an example of the estimation scheme 120, the estimation scheme 120 is not limited to the space modeling and a description related to the space modeling may also apply to other examples of the estimation scheme 120.

Space modeling may construct a spatial model from an input of an image and a pose. For example, space modeling may be performed through a volume-based signed distance function (SDF). The SDF may be advantageous for scalability or efficiency of representation. When a depth image is derived from an input image, the depth image may be backward projected based on an input pose and an SDF value of a corresponding voxel may be updated accordingly. Here, a deep feature may be used instead of depth. In a depth/feature 121 of FIG. 1, the depth may represent the depth image and the feature may represent the deep feature. A deep prior 122 may be further used for space modeling. The deep prior 122 may be a spatial deep prior.

When modeling a surface of the spatial model from views of a plurality of frames, surface information may appear inconsistently due to noise. In this example, noise may be adjusted through a weighting function during an accumulation process. When using a passive structure of the existing entire framework for space modeling, depth or feature information and pose information received as an input may be very inaccurate. Even in this example, fusion should be performed while trusting the information. Although a portion of noise may be removed through the weighting function and outlier removal, there may be some constraints in overcoming an accumulated error.

In the example of considering only space modeling, it may be difficult to efficiently store and optimize dense features of many frames. Although a model is refined with an optimal value, a refined value may not be fed back again to an input module, such as, for example, a value being calculated in the SLAM may not be updated suddenly.

The estimation scheme 110 corresponds to a high frame rate and sparse features and may have an attribute suitable for real-time estimation accordingly. The estimation scheme 120 corresponds to a low frame rate and dense features and may have an attribute suitable for precise estimation. The image processing apparatus may optimize each estimation result by integrating the estimation schemes 110 and 120 of different attributes into a single framework. The integrated optimization 130 may correspond to the above optimization operation. In an optimization process, initial data of the SLAM and the initial model of the space modeling may be adjusted. In an example, the image processing apparatus may separately define each of a reprojection error for the estimation scheme 110 and a reprojection error for the estimation scheme 120 and, here, may perform optimization such that an integration error including the reprojection error of the estimation scheme 110 and the reprojection error of the estimation scheme 120 may be minimized.

The reprojection error of the estimation scheme 110 may be referred to as a first reprojection error and the reprojection error of the estimation scheme 120 may be referred to as a second reprojection error. The image processing apparatus may determine first common space features by unprojecting first features onto a 3D space corresponding to a target space based on sensor poses, may determine first reprojection features by reprojecting the first common space features onto 2D planes corresponding to first feature frames based on the sensor poses, and may calculate the first reprojection error based on an error between the first features and the first reprojection features. Additionally, the image processing apparatus may determine second common space features by unprojecting second features onto a 3D space corresponding to the target space based on the sensor poses, may determine second reprojection features by reprojecting the second common space features onto 2D planes corresponding to second feature frames based on the sensor poses, and may calculate the second reprojection error based on an error between the second features and the second reprojection features.

The image processing apparatus may acquire an optimization result by adjusting at least a portion of the initial data and the initial model to decrease the integration error including the first reprojection error of the estimation scheme 110 and the second reprojection error of the estimation scheme 120. The integration error may correspond to a sum of the first reprojection error and the second reprojection error.

Figure 2:
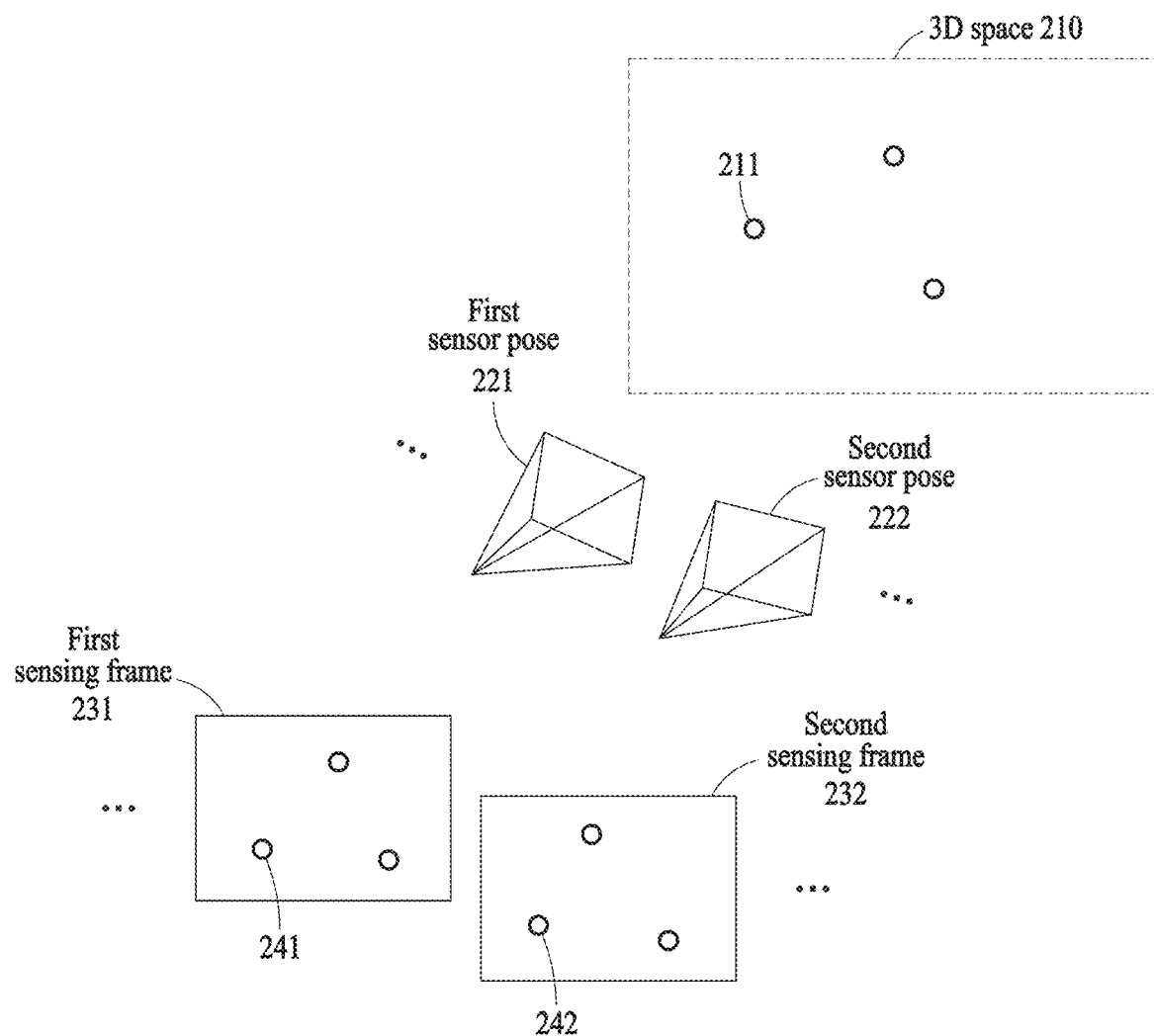
FIG. 2 illustrates an example sensor pose, a sensing frame, features of a 2D plane, and common features of a 3D space, in accordance with one or more embodiments.

FIG. 2 illustrates an example sensor pose, a sensing frame, features of a 2D plane, and common features of a 3D space.

Referring to FIG. 2, a first sensing frame 231 may be generated by sensing a 3D space 210 through a first sensor pose 221 and a second sensing frame 232 may be generated by sensing the 3D space 210 through a second sensor pose 222. The sensor pose 221/222 may correspond to a pose parameter of a sensor that senses a corresponding sensing frame. The pose parameter may include a rotation parameter and a translation parameter. The sensor may include, as non-limiting examples, a camera and a depth sensor. When the sensor corresponds to a camera, the first and second sensing frames 231 and 232 may correspond to image frames. The image processing apparatus may estimate sensor poses corresponding to the first and second sensing frames 231 and 232 based on the first and second sensing frames 231 and 232 and other sensing data (e.g., IMU data).

The image processing apparatus may generate feature frames by extracting 2D features based on the first and second sensing frames 231 and 232. For example, the first and second sensing frames 231 and 232 may correspond to a camera image and the image processing apparatus may generate feature frames by extracting features from the first and second sensing frames 231 and 232 through a feature extractor or a feature network. Also, the image processing apparatus may generate feature frames corresponding to a depth image from the first and second sensing frames 231 and 232. Additionally, the first and second sensing frames 231 and 232 may correspond to a depth image and the depth image may correspond to feature frames.

The feature extractor and the feature network may correspond to a machine learning model. The feature extractor may extract features of a first attribute from the first and second sensing frames 231 and 232, and first feature frames may be generated through features of the first attribute. The feature network may generate features of a second attribute from the first and second sensing frames 231 and 232 and second feature frames may be generated through features of the second attribute. In an example, the features of the first attribute may have a low density level compared to the features of the second attribute. When an object is present in the 3D space 210, the features of the first attribute may be sparsely distributed in a characteristic portion, for example, an edge of the corresponding object, and the features of the second attribute may be densely distributed on a plane between edges as well as the edge of the object.

Features of the first sensing frame 231 may be associated with a 2D plane corresponding to the first sensing frame 231, and features of the second sensing frame 232 may be associated with a 2D plane corresponding to the second sensing frame 232. The image processing apparatus may estimate the first and second sensor poses 221 and 222 corresponding to the first and second sensing frames 231 and 232, respectively, and may unproject the features of the 2D planes onto the 3D space 210 based on the first and second sensor poses 221 and 222. In an example, common space features 211 may be determined according to the unprojection of features 241 and 242. The common space feature 211 may be referred to as a map point. In the example of the second attribute, the common space feature 211 may be referred to as a volume or a voxel.

Figure 3:
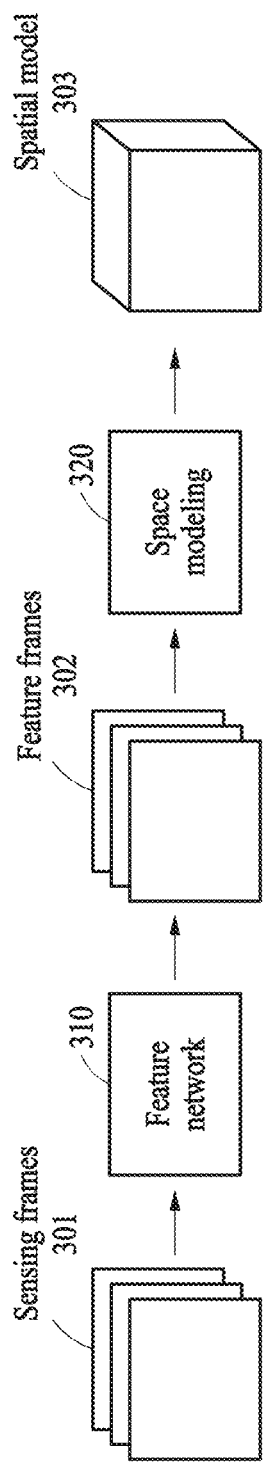
FIG. 3 illustrates an example of sensing frames, feature frames, and a spatial model, in accordance with one or more embodiments.

FIG. 3 illustrates an example of sensing frames, feature frames, and a spatial model. Referring to FIG. 3, an image processing apparatus may generate feature frames 302 corresponding to sensing frames 301 through a feature network 310. In an example, the feature network 310 may correspond to a machine learning model. The feature frames 302 may include depths or deep features. The image processing apparatus may determine a 3D spatial model 303 corresponding to the feature frames 302 through space modeling 320. In an example, the image processing apparatus may perform the space modeling 320 by fusing depths or deep features of the feature frames 302 with a volume-based SDF.

The sensing frames 301 of FIG. 3 may correspond to the first and second sensing frames 231 and 232 of FIG. 2. Therefore, space estimation of different attributes may be performed on the same space. When an object is present in the same space, 3D common space features and 2D features of a first attribute may be sparsely distributed in a characteristic portion, for example, an edge of a corresponding object, and 3D common space features and features of a second attribute (e.g., depths or deep features) may be densely distributed on a plane as well as the edge of the corresponding object.

Figure 4A:
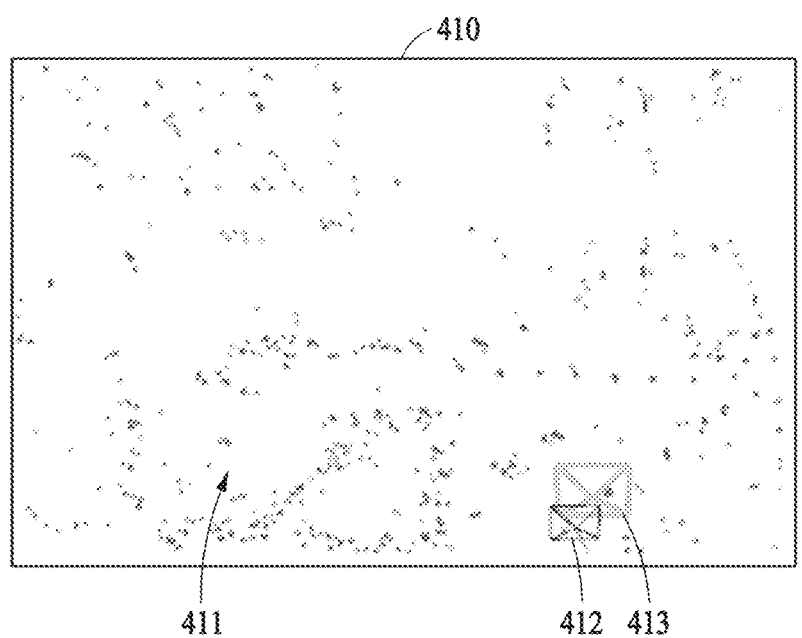
FIG. 4A illustrates an example of a local point map generated through simultaneous localization and mapping (SLAM).
Figure 4B:
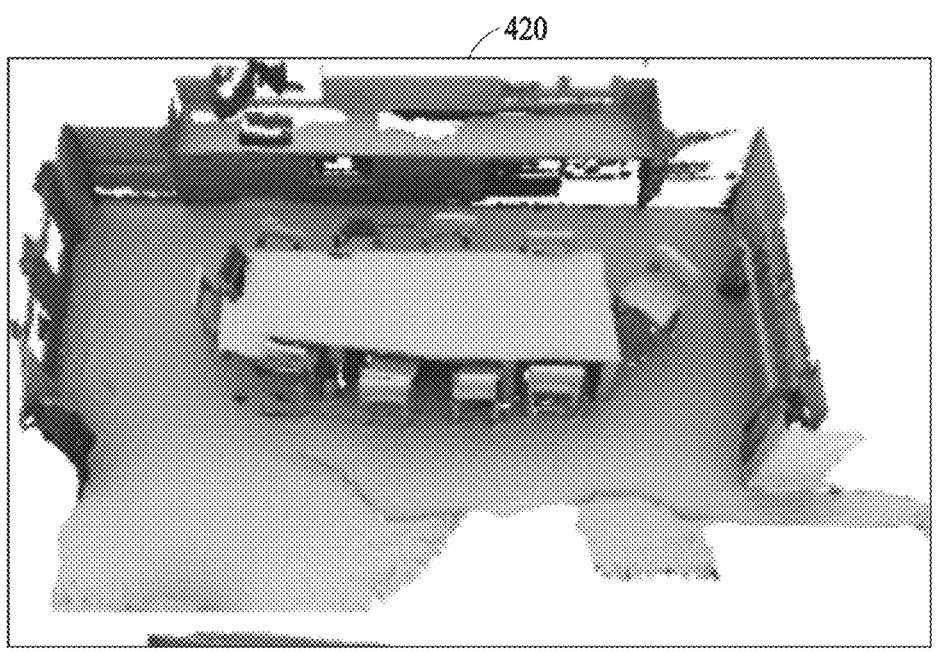
FIG. 4B illustrates an example spatial model generated through a space modeling, in accordance with one or more embodiments.

FIG. 4A illustrates an example of a local point map generated through SLAM. Referring to FIG. 4A, a local point map 410 may include map points 411. The plurality of map points 411 may be derived through sensor poses 412 and 413. The local point map 410 represents local space information through the sparse map points 411 and a lot of space information may be lost accordingly. Additionally, since information of the local point map 410 may be limited to local information, it may be difficult to secure global information. FIG. 4B illustrates an example of a spatial model generated through space modeling, in accordance with one or more embodiments. Referring to FIG. 4B, a spatial model 420 may include a plurality of space information compared to the local point map 410 of FIG. 4A. Here, in the example of using a framework that focuses on noise removal, bias of an input may corrupt the entire spatial model 420.

Figure 5:
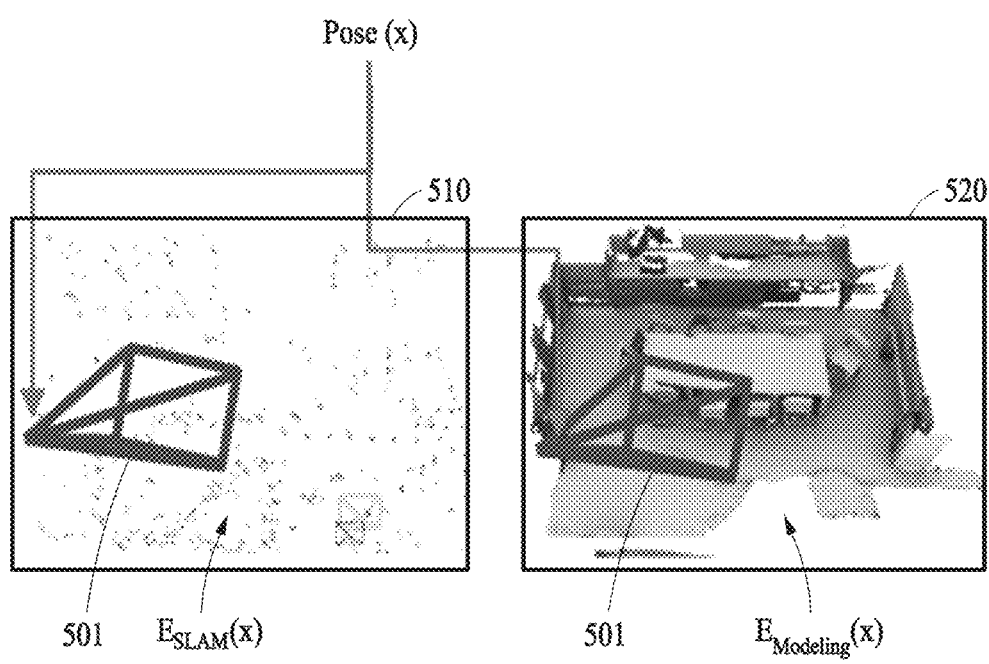
FIG. 5 illustrates an example integration error that includes a SLAM error and a modeling error, in accordance with one or more embodiments.

FIG. 5 illustrates an example of an integration error that includes a SLAM error and a modeling error. An image processing apparatus may simultaneously use a local point map 510 of a first attribute (e.g., a low density level) and a spatial model 520 of a second attribute (e.g., a high density level) when performing numerical optimization through projection.

When a texture-free area, a repetitive pattern area, or a high movement occurs in the local point map 510 due to the use of the spatial model 520 that represents global information, accuracy may be improved in a mid-and-long term calculation and the like. Additionally, since optimization may be performed by integrating a pose of space modeling, a feature image (depth (scale), feature), etc., into a single BA framework, estimation accuracy may be improved and an optimization result may be simultaneously applied to estimation schemes of different attributes. In an example, when performing modeling, a deep prior may be applied to SLAM and modeling by performing a model completion based on a convolutional neural network (CNN).

The image processing apparatus may calculate a first reprojection error of an estimation scheme of the first attribute and a second reprojection error of an estimation scheme of the second attribute, may define a sum of the first reprojection error and the second reprojection error as an integration error, and may minimize the integration error through optimization, which may be represented as Equation 1 below.

$$\underset{x}{\operatorname{argmin}}\ E_{SLAM}(x) + E_{Modeling}(x) \qquad \text{Equation 1}$$

In Equation 1, $E_{SLAM}$ denotes the first reprojection error, $E_{Modeling}$ denotes the second reprojection error, and x denotes an optimization variable. The local point map 510 and the spatial model 520 may share a sensor pose 501. The sensor pose 501 may be represented as Pose(x). The image processing apparatus may minimize the integration error while adjusting the sensor pose (Pose(x)), a map point of the local point map 510, and a feature image.

Figure 6:
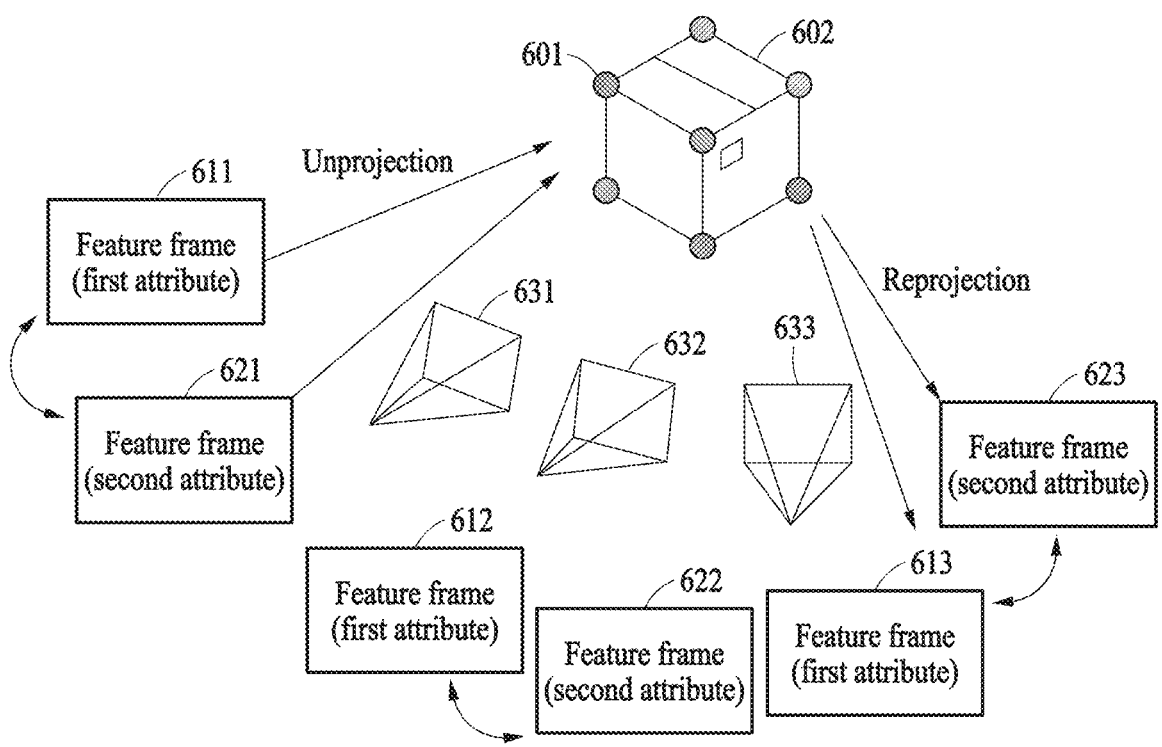
FIG. 6 illustrates an example optimization operation based on an integration error, in accordance with one or more embodiments.

FIG. 6 illustrates an example of an optimization operation based on an integration error, in accordance with one or more embodiments.

An image processing apparatus may perform optimization with a point map based on features of a first attribute and a model based on features of a second attribute when performing numerical optimization based on reprojection of BA. The image processing apparatus may perform optimization through an integration error in which a reprojection error of sparse features and a reprojection error of dense features are applied instead of cross-comparing the sparse features and the dense features, which are different features. The image processing apparatus may consider modeling of the second attribute and may estimate a spatial model using an optimized pose.

Referring to FIG. 6, the image processing apparatus may generate feature frames 611, 612, and 613 of the first attribute, and feature frames 621, 622, and 623 of the second attribute based on respective sensing frames of sensor poses 631, 632, and 633. The image processing apparatus may determine 3D common space features of the first attribute, for example, common space features 601, by unprojecting 2D features of the feature frames 611, 612, and 613 onto a 3D space. The feature frames 621, 622, and 623 may correspond to a depth image or a deep feature image. The image processing apparatus may determine a 3D spatial model 602 by unprojecting 2D features of the feature frames 621, 622, and 623 onto the 3D space. The spatial model 602 may include common space features of the second attribute. For convenience of description, the spatial model 602 is illustrated in a form of a box of FIG. 6, the spatial model 602 may correspond to another shape or structure, such as another object, a plurality of objects, and a space that includes the plurality of objects.

The image processing apparatus may determine reprojection features by reprojecting the common space features of the first attribute and the common space features of the second attribute onto 2D planes corresponding to the feature frames 611, 612, and 613 and the feature frames 621, 622, and 623. The common space features of the second attribute according to the spatial model 602 may be reprojected through volume-based ray casting. The image processing apparatus may calculate a first reprojection error by comparing reprojection features of the common space features of the first attribute and the features of the feature frames 611, 612, and 613, and may calculate a second reprojection error by comparing reprojection features of the common space features of the second attribute and the features of the feature frames 621, 622, and 623. The image processing apparatus may adjust at least a portion of the common space features (or unprojection features) of the first attribute, the common space features (or unprojection features) of the second attribute, the sensor poses 631, 632, and 633, 2D features of the first attribute, and 2D features of the second attribute, to decrease an integration error that includes the first reprojection error and the second reprojection error.

In an example, when a first 2D feature of the feature frame 611, a second 2D feature of the feature frame 612, and the common space feature 601 are matched to each other according to initial SLAM data, the image processing apparatus may determine a first error by comparing the first 2D feature and a first reprojection feature of the common space feature 601 for the 2D plane of the feature frame 611, may determine a second error by comparing the second 2D feature and a second reprojection feature of the common space feature 601 for the 2D plane of the feature frame 612, and may determine the first reprojection error based on the first error and the second error.

The above BA process may be performed in relation to the second reprojection error. Here, in the example of the second attribute, reprojection may be performed through volume-based ray casting. When a first depth value (or deep feature) of the feature frame 621, a second depth value of the feature frame 622, and a corresponding space feature of the spatial model 602 are matched with each other according to an initial model, the image processing apparatus may determine a first error by comparing the first depth value and a first reprojection feature of a corresponding space feature for the 2D plane of the feature frame 621, may determine a second error by comparing the second depth value and a second reprojection feature of the corresponding space feature for the 2D plane of the feature frame 622, and may determine the second reprojection error based on the first error and the second error.

The above optimization method may consider a local motion response ability of a space estimation scheme (e.g., SLAM) of a sparse attribute and global geometry information of a space estimation scheme (e.g., 3D space modeling) of a dense attribute and accordingly may improve a mid- and-long term response ability of the first and may improve accuracy of a pose and a model by considering a fusion result of the second.

Figure 7:
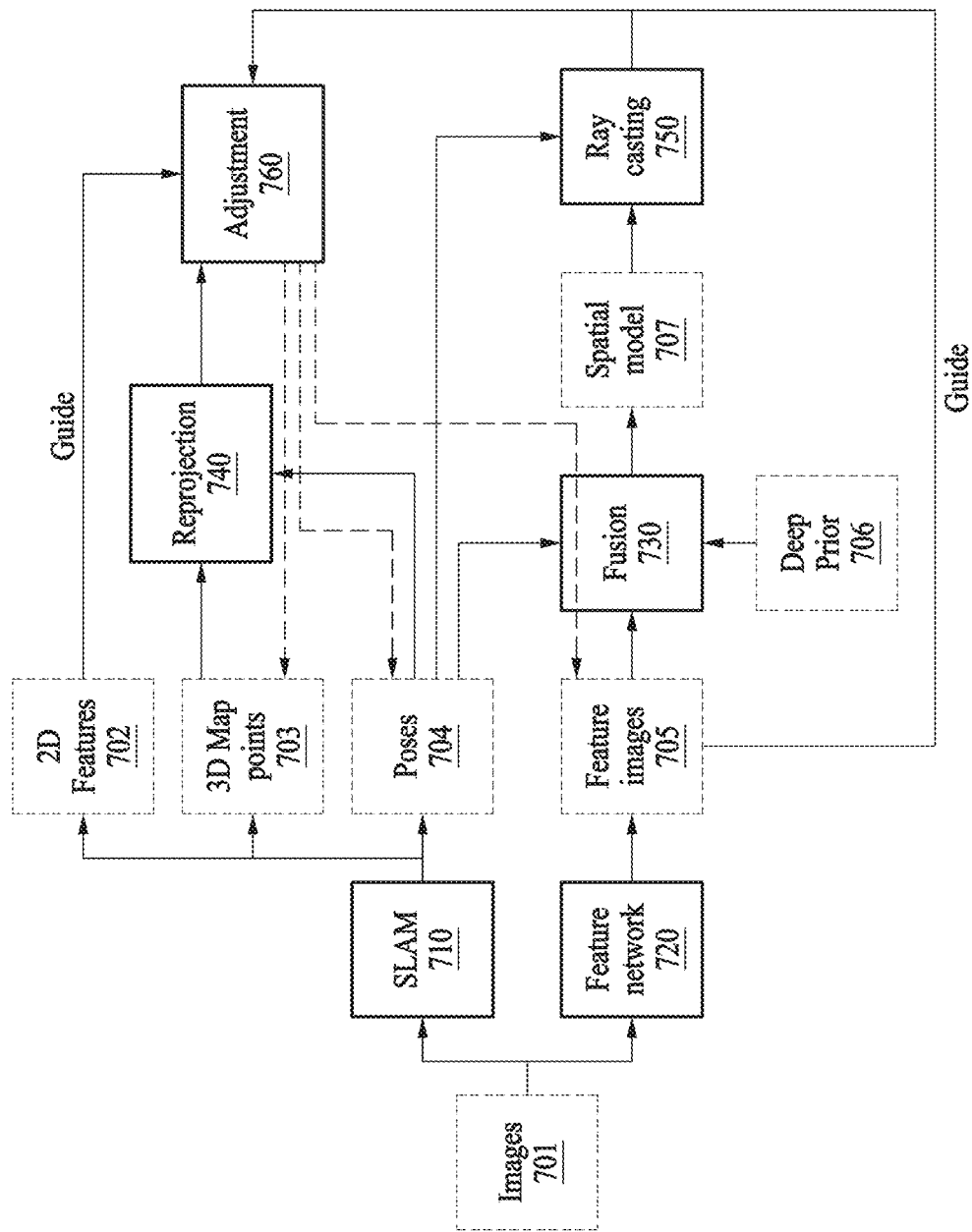
FIG. 7 illustrates an example detailed operation for optimization, in accordance with one or more embodiments.

FIG. 7 illustrates an example of a detailed operation for optimization. Referring to FIG. 7, an image processing apparatus may determine 2D features 702, 3D map points 703, and poses 704 by performing SLAM 710 based on images 701. The SLAM 710 may correspond to an estimation scheme of a first attribute, and the 2D features 702 and the 3D map points 703 may correspond to features of the first attribute. The image processing apparatus may generate feature images 705 corresponding to the images 701 based on a feature network 720, and may generate a spatial model 707 by performing fusion 730 on the feature images 705 based on the poses 704 and a deep prior 706. The fusion 730 may correspond to an estimation scheme of a second attribute and deep features of the feature images 705 and common space features (or volume values or voxel values) of the spatial model 707 may correspond to features of the second attribute. Depth values of depth images may be used instead of the deep features of the feature images 705.

The image processing apparatus may determine reprojection features by performing a reprojection 740 on the 3D map points 703 on a 2D plane based on the poses 704. The image processing apparatus may calculate a first reprojection error based on a difference between the 2D features 702 and the reprojection features. The image processing apparatus may determine the reprojection features by performing ray casting 750 of the common space features of the spatial model 707 on the 2D plane based on the poses 704. The image processing apparatus may calculate a second reprojection error based on a difference between the deep features of the feature images 705 and the reprojection features.

The image processing apparatus may determine an integration error based on the first reprojection error and the second reprojection error, and may perform adjustment 760 on at least a portion of the 2D features 702, the 3D map points 703, the poses 704, the feature images 705, and the spatial model 707 based on the integration error. When the feature images 705 correspond to depth images, depth values may be adjusted. When the feature images 705 correspond to deep features, feature values may be adjusted. The image processing apparatus may derive the 2D features 702, the 3D map points 703, the poses 704, the feature images 705, and the spatial model 707 that may minimize the integration error.

Figure 8:
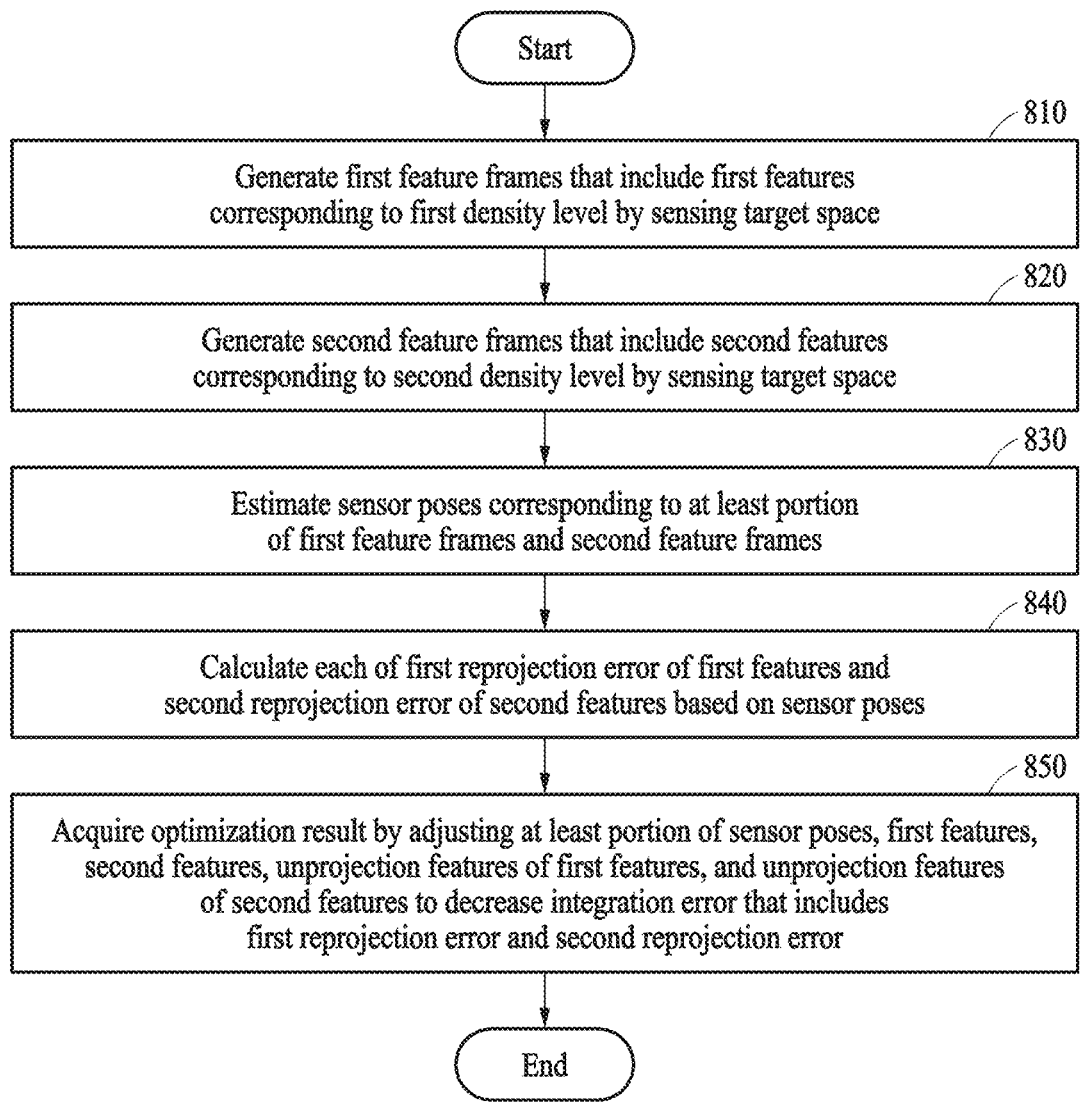
FIG. 8 illustrates an example image processing operation, in accordance with one or more embodiments.

FIG. 8 illustrates an example of an image processing operation. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, an image processing apparatus generates first feature frames that include first features corresponding to a first density level by sensing a target space. In operation 820, the image processing apparatus generates second feature frames that include second features corresponding to a second density level by sensing the target space. In an example, the second density level may be higher than the first density level. The first feature frames may be generated at a first frame rate, the second feature frames may be generated at a second frame rate, and, in a non-limited example, the first frame rate may be greater than the second frame rate. The first features may correspond to hand-crafted features, and the second features may correspond to depths or deep features.

In operation 830, the image processing apparatus estimates sensor poses corresponding to at least a portion of the first feature frames and at least a portion of the second feature frames. The first feature frames may be used for SLAM of the first density level and the second feature frames may be used for 3D space modeling of the second density level.

In operation 840, the image processing apparatus calculates each of a first reprojection error of the first features and a second reprojection error of the second features based on the sensor poses. In operation 840, the image processing apparatus may determine first common space features by unprojecting the first features onto a 3D space corresponding to the target space based on the sensor poses, may determine first reprojection features by reprojecting the first common space features onto 2D planes corresponding to the first feature frames based on the sensor poses, and may calculate the first reprojection error based on an error between the first features and the first reprojection features. In operation 840, the image processing apparatus may determine second common space features by unprojecting the second features onto a 3D space corresponding to the target space based on the sensor poses, may determine second reprojection features by reprojecting the second common space features onto 2D planes corresponding to the second feature frames based on the sensor poses, and may calculate the second reprojection error based on an error between the second features and the second reprojection features.

In operation 850, the image processing apparatus acquires an optimization result by adjusting at least a portion of the sensor poses, the first features, the second features, unprojection features of the first features, and unprojection features of the second features to decrease an integration error that includes the first reprojection error and the second reprojection error. The integration error may correspond to a sum of the first reprojection error and the second reprojection error.

Additionally, descriptions made with reference to FIGS. 1 to 7 and FIGS. 9 to 11 may apply to the image processing operation.

Figure 9:
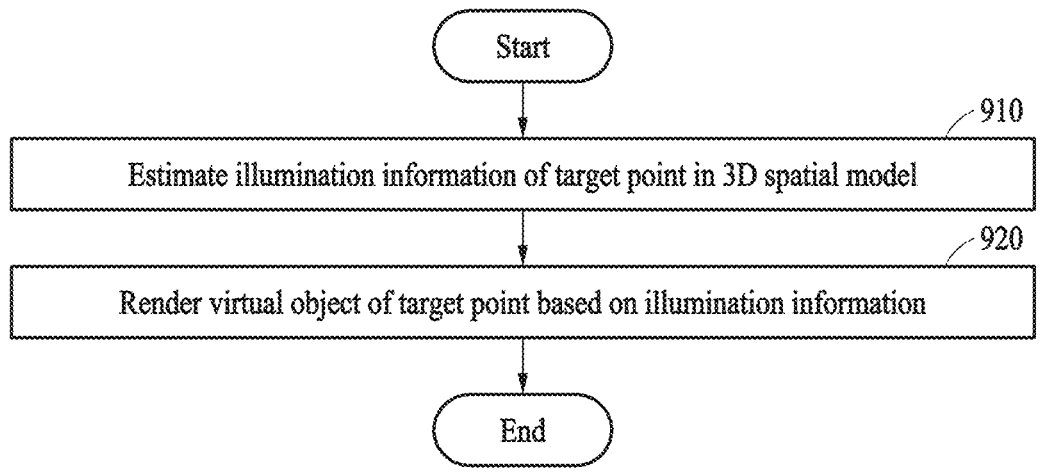
FIG. 9 illustrates an example virtual object rendering operation implementing a spatial model, in accordance with one or more embodiments.

FIG. 9 illustrates an example of a virtual object rendering operation implementing a spatial model.

Referring to FIG. 9, in operation 910, an image processing apparatus estimates illumination information at a target point in a 3D spatial model. In an example, the 3D spatial model may be modeled according to an optimization result. For example, operation 910 may be performed after operation 850 of FIG. 8. According to the optimization, the 3D spatial model may include accurate space information about each point in the 3D spatial model. The space information may include the illumination information. The illumination information may include information about all illuminations that affect any point in the 3D spatial model. In an example, the illumination information may include information pertaining to at least a portion of a position, a form, a shape, a brightness, a color, and a high dynamic range (HDR) of each illumination. The illumination information may represent an illumination in various forms. For example, the illumination information may express light in a form of an environment map or may express light using a predefined attribute (e.g., a direction, a color, a brightness, a width, etc.).

The spatial model may include an illumination information channel that represents illumination information of the spatial model. In an example, the illumination information channel may specify an area that has an HDR or includes an illumination through a flag, or may express illumination information in various different manners. In an example, the spatial model may represent all space features of the spatial model in an HDR format and illumination information may be expressed in detail in an area in which the illumination is present through the HDR format. In another example, the spatial model may represent only space features of an area in which the illumination is present in the spatial model in the HDR format, and may represent space features of an area in which the illumination is absent in a different format (e.g., red green blue (RGB), a low dynamic range (LDR), etc.). In another example, the HDR format may not be applied to the spatial model and a position of the illumination may be specified through a flag. Detailed information (information about a form, a shape, a brightness, a color, an HDR) of the corresponding illumination may be separately stored in a different storage space separate from the spatial model, and information of the corresponding illumination may be acquired by accessing the storage space through the corresponding flag.

In operation 920, the image processing apparatus may render a virtual object of the target point based on the illumination information. The virtual object may be expressed through, as only examples, augmented reality (AR), computer graphics (CG), and similar processes. The virtual object may be realized more realistically through the illumination information. In an example, when the AR is provided by overlapping the virtual object at a target point of an input image, the virtual object may be expressed without discomfort in the input image by applying illumination information of the target point to the virtual object.

Additionally, descriptions made with reference to FIGS. 1 to 8, FIG. 10, and FIG. 11 may apply to an object rendering operation.

Figure 10:
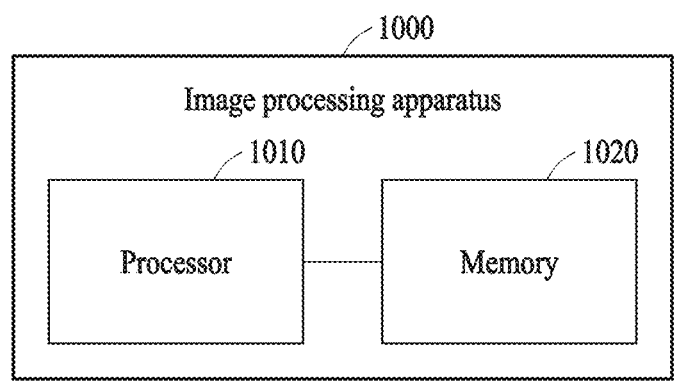
FIG. 10 illustrates an example configuration of an image processing apparatus, in accordance with one or more embodiments.

FIG. 10 illustrates an example of a configuration of an example image processing apparatus.

Referring to FIG. 10, an example image processing apparatus 1000 includes one or more processors 1010 and one or more memories 1020. The memory 1020 may be connected to the processor 1010 and may store instructions executable by the processor 1010, data to be operated by the processor 1010, or data processed by the processor 1010. The memory 1020 may include a non-transitory computer-readable record medium, for example, a high-speed random access memory and/or a non-volatile computer-readable storage medium (e.g., at least one disk storage device, flash memory device, or other non-volatile solid state memory devices).

The processor 1010 may execute instructions for performing operations of FIGS. 1 to 9 and FIG. 11. For example, the processor 1010 may generate first feature frames that include first features corresponding to a first density level by sensing a target space, may generate second feature frames that include second features corresponding to a second density level by sensing the target space, may estimate sensor poses corresponding to at least a portion of the first feature frames and the second feature frames, may calculate each of a first reprojection error of the first features and a second reprojection error of the second features based on the sensor poses, and may acquire an optimization result by adjusting at least a portion of the sensor poses, the first features, the second features, unprojection features of the first features, and unprojection features of the second features to decrease an integration error that includes the first reprojection error and the second reprojection error. Here, the second density level may be higher than the first density level. In addition, descriptions of FIGS. 1 to 9 and FIG. 11 may apply to the image processing apparatus 1000.

Figure 11:
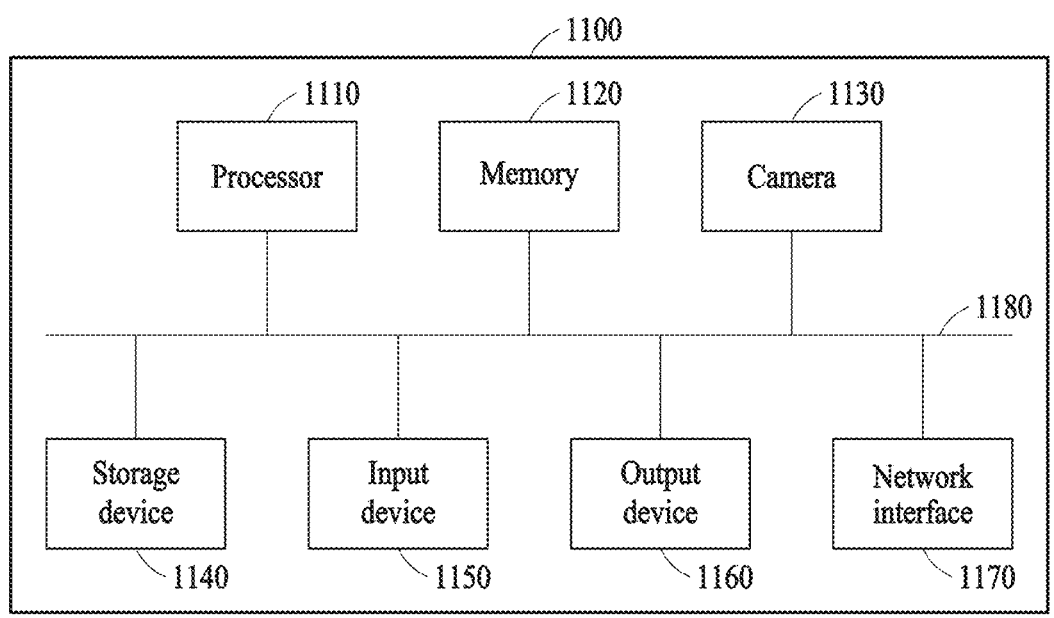
FIG. 11 illustrates an example configuration of an electronic device, in accordance with one or more embodiments.

FIG. 11 illustrates an example of a configuration of an example electronic device.

Referring to FIG. 11, an example electronic device 1100 may include a processor 1110, a memory 1120, a camera 1130, a storage device 1140, an input device 1150, an output device 1160, and a network interface 1170, and may communicate with each other through a communication bus 1180. For example, the electronic device 1100 may be implemented as at least a portion of a mobile device such as a mobile phone, a smartphone, a personal digital assistant (PDA), a netbook, a tablet computer, and a laptop computer, a wearable device such as a smart watch, a smart band, and smart glasses, a computing device such as a desktop and a server, a home appliance such as a television, a smart television, and a refrigerator, a security device such as a door lock, and a vehicle such as an autonomous driving vehicle and a smart vehicle. The electronic device 1100 may structurally and/or functionally include the image processing apparatus 1000 of FIG. 10.

The processor 1110 executes a function and instructions for execution in the electronic device 1100. For example, the processor 1110 may process instructions stored in the memory 1120 or the storage device 1140. The processor 1110 may perform the operation described with reference to FIGS. 1 to 10. The memory 1120 may include a computer-readable storage medium or a computer-readable storage device. The memory 1120 may store instructions for execution by the processor 1110 and may store related information while software and/or an application is being executed by the electronic device 1100.

The camera 1130 may take a picture and/or a video. The picture and/or the video may correspond to an input image. The camera 1130 may correspond to an example of a sensor. When the sensor generates sensing data by sensing a target space, the processor 1110 may generate feature frames based on the sensing data. The storage device 1140 includes a computer-readable storage medium or a computer-readable storage device. The storage device 1140 may store a larger amount of information than the memory 1120 and may store the information for a long period of time. In an example, the storage device 1140 may include a magnetic hard disk, an optical disc, a flash memory, a floppy disk, or any other non-volatile memory known in the art.

The input device 1150 may receive an input from a user through a typical input method through a keyboard and a mouse and new input methods such as a touch input, a voice input, and an image input. In an example, the input device 1150 may include, as non-limiting examples, a keyboard, a mouse, a touchscreen, a microphone, or other devices that detect an input from the user and transmit the detected input to the electronic device 1100. The output device 1160 may provide the user with an output of the electronic device 1100 through a visual, auditory, or tactile channel. The output device 1160 may include, for example, a display, a touchscreen, a speaker, a vibration generation device, or other devices capable of providing the output to the user. The network interface 1170 may communicate with an external device through a wired network or a wireless network.

The image processing apparatus 1000, processor 1010, memory 1020, electronic device 1100, processor 1110, memory 1120, camera 1130, storage device 1140, input device 1150, output device 1160, network interface 1170, and other apparatuses, units, modules, devices, and other components described herein and with respect to FIGS. 1-11, are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application and illustrated in FIGS. 1-11 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

The aforementioned hardware device may be configured to operate as one or more software modules to perform the operation of the examples, or vice versa.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:

generating first feature frames that comprise first features corresponding to a first density level by sensing a target space;

generating second feature frames that comprise second features corresponding to a second density level by sensing the target space;

estimating sensor poses corresponding to at least a portion of the generated first feature frames and the generated second feature frames;

calculating each of a first reprojection error of the first features and a second reprojection error of the second features based on the estimated sensor poses; and acquiring an optimization result by adjusting at least a portion of the sensor poses, the first features, the second features, unprojection features of the first features, and unprojection features of the second features to decrease an integration error that comprises the first reprojection error and the second reprojection error, wherein the second density level is higher than the first density level.

2. The method of claim 1, wherein the calculating of each of the first reprojection error and second reprojection error comprises:

determining first common space features by unprojecting the first features onto a three-dimensional (3D) space corresponding to the target space based on the estimated sensor poses;

determining first reprojection features by reprojecting the first common space features onto two-dimensional (2D) planes corresponding to the generated first feature frames based on the estimated sensor poses; and calculating the first reprojection error based on an error between the first features and the first reprojection features.

3. The method of claim 1, wherein the calculating of each of the first reprojection error and the second reprojection error comprises:

determining second common space features by unprojecting the second features onto a 3D space corresponding to the target space based on the estimated sensor poses;

determining second reprojection features by reprojecting the second common space features onto 2D planes corresponding to the second feature frames based on the estimated sensor poses; and calculating the second reprojection error based on an error between the second features and the second reprojection features.

4. The method of claim 1, wherein the first feature frames are generated at a first frame rate,
wherein the second feature frames are generated at a second frame rate, and
wherein the first frame rate is greater than the second frame rate.

5. The method of claim 1, wherein the first features correspond to hand-crafted features, and
wherein the second features correspond to depths or deep features.

6. The method of claim 1, wherein the integration error corresponds to a sum of the first reprojection error and the second reprojection error.

7. The method of claim 1, wherein the first feature frames are implemented for simultaneous localization and mapping (SLAM) of the first density level, and
wherein the second feature frames are implemented for three-dimensional (3D) space modeling of the second density level.

8. The method of claim 7, further comprising:
estimating illumination information at a target point in a spatial model based on the 3D space modeling; and
rendering a virtual object of the target point based on the illumination information.

9. The method of claim 8, wherein the spatial model comprises an illumination information channel that represents information about at least a portion of a position, a form, a shape, a brightness, a color, and a high dynamic range (HDR) of each illumination of the spatial model, and
wherein the estimating of the illumination information comprises estimating the illumination information based on the illumination information channel.

10. A non-transitory computer-readable record medium storing an instruction that, when executed by a processor, cause the processor to perform the image processing method of claim 1.

11. An image processing apparatus, comprising:
one or more processors; and
a memory comprising instructions executable by the one or more processors,
wherein, when the instructions are executed by the one or more processors, the one or more processors are configured to:
generate first feature frames that comprise first features corresponding to a first density level by sensing a target space,
generate second feature frames that comprise second features corresponding to a second density level by sensing the target space,
estimate sensor poses corresponding to at least a portion of the generated first feature frames and the generated second feature frames,
calculate each of a first reprojection error of the first features and a second reprojection error of the second features based on the estimated sensor poses, and
acquire an optimization result by adjusting at least a portion of the sensor poses, the first features, the second features, unprojection features of the first features, and unprojection features of the second features to decrease an integration error that comprises the first reprojection error and the second reprojection error, and
wherein the second density level is higher than the first density level.

12. The apparatus of claim 11, wherein the one or more processors are further configured to:
determine first common space features by unprojecting the first features onto a three-dimensional (3D) space corresponding to the target space based on the estimated sensor poses,
determine first reprojection features by reprojecting the first common space features onto two-dimensional (2D) planes corresponding to the generated first feature frames based on the estimated sensor poses, and
calculate the first reprojection error based on an error between the first features and the first reprojection features.

13. The apparatus of claim 11, wherein the one or more processors are further configured to:
determine second common space features by unprojecting the second features onto a 3D space corresponding to the target space based on the estimated sensor poses,
determine second reprojection features by reprojecting the second common space features onto 2D planes corresponding to the second feature frames based on the estimated sensor poses, and
calculate the second reprojection error based on an error between the second features and the second reprojection features.

14. The apparatus of claim 11, wherein the first feature frames are generated at a first frame rate,
wherein the second feature frames are generated at a second frame rate, and
wherein the first frame rate is greater than the second frame rate.

15. The apparatus of claim 11, wherein the first features correspond to hand-crafted features, and
wherein the second features correspond to depths or deep features.

16. The apparatus of claim 11, wherein the second feature frames are implemented for three-dimensional (3D) space modeling of the second density level, and
wherein a spatial model according to the 3D space modeling comprises an illumination information channel that represents information about at least a portion of a position, a form, a shape, a brightness, a color, and a high dynamic range (HDR) of each illumination of the spatial model, and
the processor is further configured to:
estimate illumination information at a target point in the spatial model based on the illumination information channel, and
render a virtual object of the target point based on the illumination information.

17. An electronic device, comprising:
at least one sensor configured to generate sensing data by sensing a target space; and
one or more processors configured to:
generate first feature frames that comprise first features corresponding to a first density level based on the generated sensing data,
generate second feature frames that comprise second features corresponding to a second density level based on the generated sensing data,
estimate sensor poses corresponding to at least a portion of the generated first feature frames and the generated second feature frames,
calculate each of a first reprojection error of the first features and a second reprojection error of the second features based on the estimated sensor poses, and
acquire an optimization result by adjusting at least a portion of the sensor poses, the first features, the second features, unprojection features of the first features, and unprojection features of the second features to decrease an integration error that comprises the first reprojection error and the second reprojection error, wherein the second density level is higher than the first density level.

18. The electronic device of claim 17, wherein the one or more processors are further configured to:

determine first common space features by unprojecting the first features onto a three-dimensional (3D) space corresponding to the target space based on the estimated sensor poses, determine first reprojection features by reprojecting the first common space features onto two-dimensional (2D) planes corresponding to the generated first feature frames based on the estimated sensor poses, calculate the first reprojection error based on an error between the first features and the first reprojection features, determine second common space features by unprojecting the second features onto a 3D space corresponding to the target space based on the estimated sensor poses, determine second reprojection features by reprojecting the second common space features onto 2D planes corresponding to the second feature frames based on the estimated sensor poses, and calculate the second reprojection error based on an error between the second features and the second reprojection features.

19. The electronic device of claim 17, wherein the first feature frames are generated at a first frame rate, wherein the second feature frames are generated at a second frame rate, wherein the first features correspond to hand-crafted features, wherein the second features correspond to depths or deep features, and wherein the first frame rate is greater than the second frame rate.

20. The electronic device of claim 17, wherein the second feature frames are implemented for three-dimensional (3D) space modeling of the second density level, a spatial model according to the 3D space modeling comprises an illumination information channel that represents information about at least a portion of a position, a form, a shape, a brightness, a color, and a high dynamic range (HDR) of each illumination of the spatial model, and the one or more processors are further configured to:

estimate illumination information at a target point in the spatial model based on the illumination information channel, and render a virtual object of the target point based on the illumination information.

* * * * *